June 20, 1961

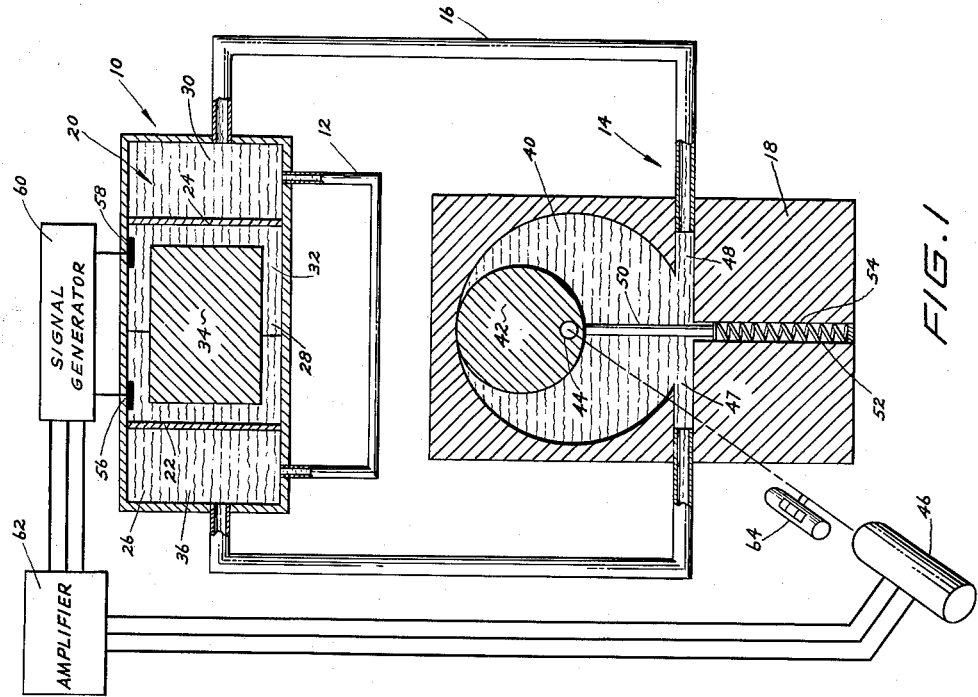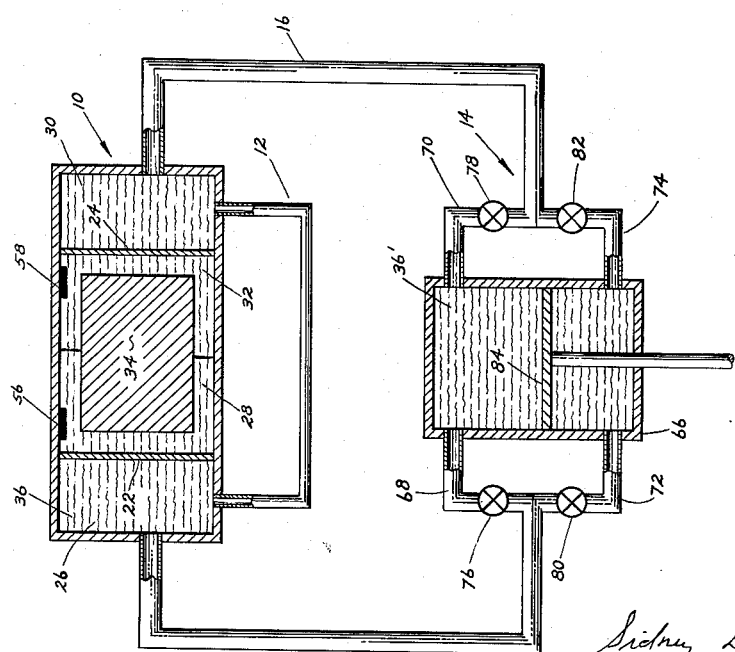

S. LEES 2,988,920

NULL TYPE INTEGRATING ACCELEROMETER

Filed Sept. 26, 1958

INVENTOR.
Sidney Lees
BY
George L. Greenfield
atty

June 20, 1961 S. LEES 2,988,920
NULL TYPE INTEGRATING ACCELEROMETER
Filed Sept. 26, 1958 3 Sheets-Sheet 3

INVENTOR
Sidney Lees
BY

United States Patent Office 2,988,920
Patented June 20, 1961

2,988,920
NULL TYPE INTEGRATING ACCELEROMETER
Sidney Lees, 544 Walnut St., Newton, Mass.
Filed Sept. 26, 1958, Ser. No. 763,623
16 Claims. (Cl. 73—503)

This invention relates to acceleration measuring devices and more particularly comprises an improvement over the accelerometers disclosed in my copending applications Serial No. 655,035, filed April 25, 1957, and Serial No. 710,660, filed January 23, 1958.

In my copending application Serial No. 655,035, I disclose an integrating accelerometer which employs liquids as the seismic element. The integrating accelerometer is in the form of a closed fluid system formed by a continuous passage subdivided into a plurality of compartments by thin and flexible diaphragms extending across it. The fluids that fill the compartments are Newtonian liquids of different densities. The liquids are displaced in the system in response to movement of the instrument. A signal generator built into an enlarged portion of the passage measures the displacement of the liquid. The measured displacement is proportional to the change in velocity of the instrument.

In my copending application Serial No. 710,660, I disclose an integrating angular accelerometer with many of the characteristics of the instrument described above. In this device, a closed and endless fluid passage is formed in a case adapted to be connected to the mass whose instantaneous changes in angular velocity are to be measured. The closed fluid path is arranged in the case so that it has a finite projected area in a plane perpendicular to the axis about which the changes in velocity are to be measured. One portion of the passage has a cross-section substantially smaller than the cross-section of the remaining portion of the passage. The entire passage is filled with a Newtonian fluid and the fluid is allowed to circulate in the passage in response to acceleration of the case. The restricted portion of the passage provides amplified viscous damping and together with the viscosity of the liquid introduces the integrating function into the device. A signal generator is disposed in the unrestricted portion of the passage and responds to the displacement of the liquid. The displacement is proportional to the change in angular velocity of the case.

The direct reading instruments described above are satisfactory for many applications, but those skilled in the art are aware that a null-type system has many additional advantages. For example, the diaphragms extending across the continuous passages exert some restraint when the liquid is displaced. It is necessary in the direct reading instruments to make the diaphragms of thin and flexible material to minimize the restraint. In a null-type system, the displacement of the diaphragms is limited by applying counter pressures. Another disadvantage of the earlier devices is the necessity to limit the displacement of the diaphragms and, therefore, to limit the range of the velocity that can be measured. The limitations may be expressed as the ratio of the maximum velocity that can be measured to the minimum velocity that can be detected. In a null-type system the minimum velocity that can be measured is limited only by the capabilities of the indicating system so that the ratio of the maximum to minimum measurable velocity is effectively infinite, but is quite finite for the direct reading instrument. Thus, two important advantages of a null-type system are the increases in accuracy and range afforded the instrument.

The primary object of my invention is to reduce to a minimal amount the displacement of the seismic element in an integrating accelerometer.

Another object of my invention is to increase the accuracy and range of integrating accelerometers.

To accomplish the several objects of my invention, I employ a closed and continuous fluid path defined by an endless passage formed within a case. One portion of the passage has a cross sectional area much larger than the cross sectional area of the remaining portion of the passage. In the linear integrating accelerometer, a pair of diaphragms extend across the enlarged portion of the passage and divide the closed continuous path into two non-communicating compartments. Newtonian liquids of different densities fill each of the compartments and changes in velocity of the instrument cause the liquids to displace within the closed path. The restricted portion of the passage and the viscous Newtonian fluids introduce an inherent integrating function into the device. The mathematical analysis of this integration is presented in detail in my copending application, supra.

Disposed within the enlarged portion of the passage is a float which has a density equal to the density of the liquid within that portion of the passage. Thus, the float in effect forms part of that liquid and displaces with it in response to changes in velocity of the instrument. Although a float is shown as the means for detecting displacement of the liquid, obviously other devices may be used. For example, a diaphragm secured to the walls of the passage and surrounded by the liquid may be employed as the displacement sensing element.

In one embodiment of my invention the integrating linear accelerometer includes a second passage having its ends connected to the first passage outside of the diaphragms which define the compartment containing the float. The second passage is interrupted by a housing containing a piston. The portions of the second passage which join the housing are bifurcated to include branches which are connected to opposite ends of the housing on each side of the piston. Valves are disposed in each branch and are controlled by an electrical switching system that opens and closes the valves in diagonally opposed pairs as is described in detail below. The second passage along with the housing is also filled with a liquid, and the piston disposed in the housing displaces that liquid in a direction opposed to the displacement of the liquid in the first passage to null the system.

The piston is controlled by a signal generator which responds to displacement of the float. The signal produced by the signal generator is amplified and relayed to a motor which drives the piston. The movement of the piston controls switches in the circuits of the solenoids which in turn control the valves.

In a second and preferred embodiment of my invention, the bifurcated passages, valves, and pistons are replaced by a positive displacement bidirectional rotary pump. The pump is connected in the second passage and moves the contained liquid in a direction opposed to that caused by the change in velocity of the instrument.

In another embodiment of my invention the nulling subsystem employing the positive displacement bidirectional rotary pump is connected to the closed continuous passage of the integrating angular accelerometer. The subsystem operates in precisely the same way with the angular accelerometer as with the linear accelerometer to obtain the same results, that is, to null the displacement of the seismic element.

These and other objects and features of my invention along with its many advantages will be better understood and appreciated from the foregoing detailed description of one embodiment thereof, selected for purposes of illustration and shown in the accompanying drawing, in which:

FIGURE 1 is a diagrammatic view partly in section of a preferred embodiment of a null-type integrating accelerometer constructed in accordance with my invention;

FIGURE 2 is a diagrammatic view of aother embodiment of my invention;

Figure 7:
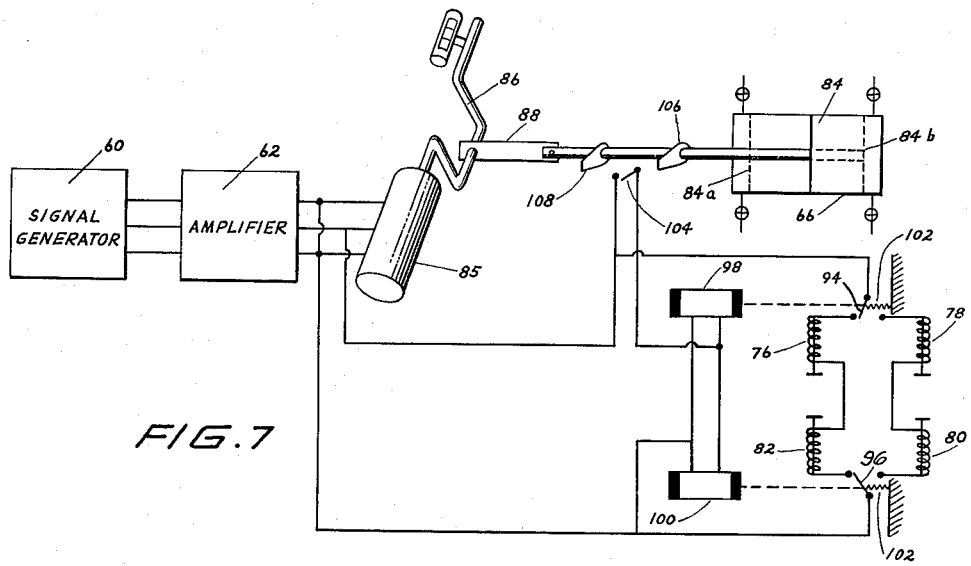
Figures 8, 9:
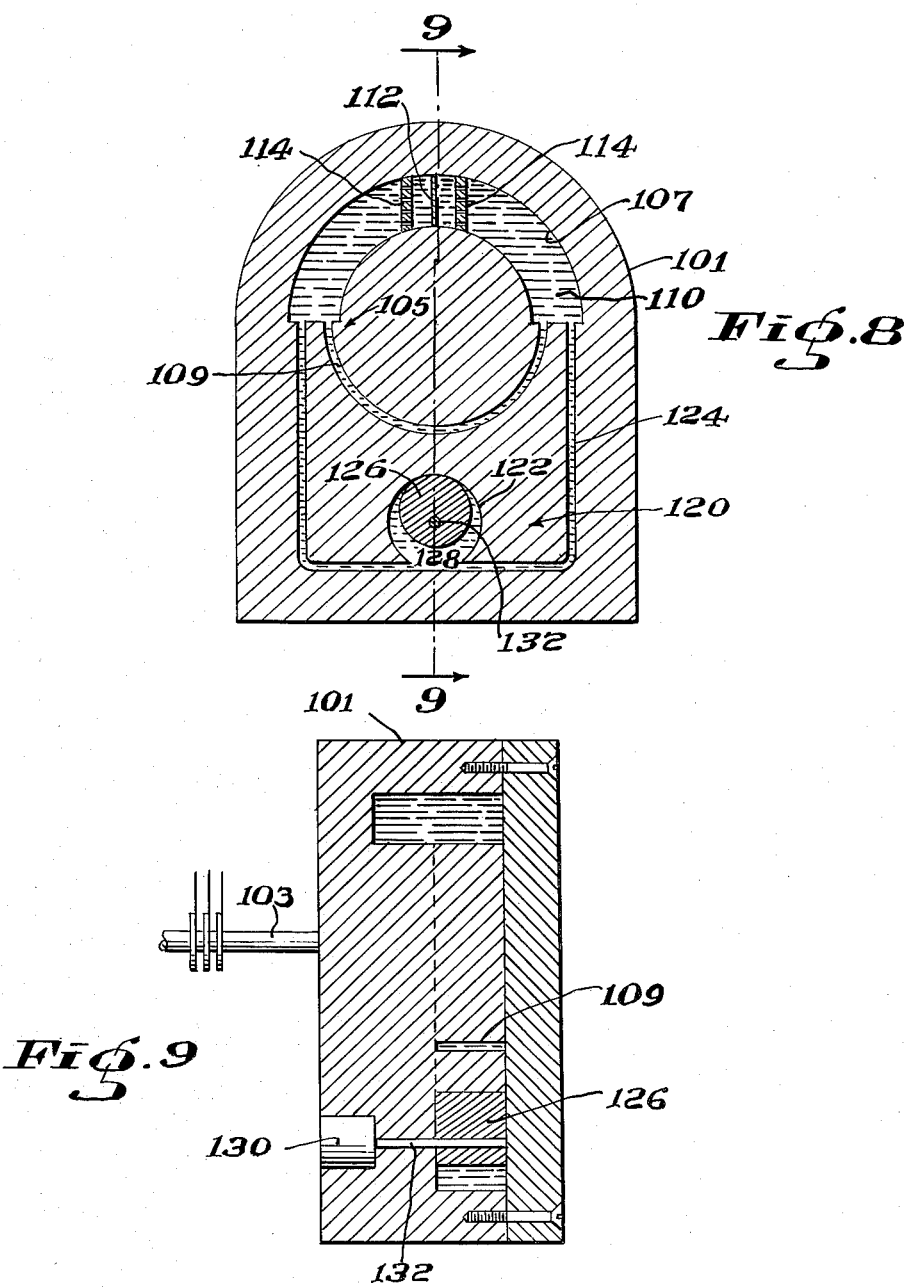

FIGURE 7, partially diagrammatic and partially schematic, illustrates one form of a sensing and control circuit which may be used in the embodiment of my invention shown in FIGURE 2;

FIGURE 8 is a diagrammatic view in cross section of another embodiment of my invention; and FIGURE 9 is a cross sectional view taken along the section line 9—9 of FIGURE 8.

The embodiment of my invention illustrated in FIGURE 1 includes in its general organization a case 10, a capillary passage 12 connected to the ends of the case, and a nulling subsystem 14 which includes a passage 16 interrupted by a housing 18.

The case 10 which may have any cross sectional shape defines a chamber 20, and a pair of thin and flexible diaphragms 22 and 24 extend across it. The diaphragms 22 and 24 subdivide the chamber 20 into three compartments 26, 28, and 30. While the compartment 28 is isolated, the capillary passage 12 has its ends connected to the compartments 26 and 30 and provides fluid communication between them. The chamber 20 and the capillary passage 12 together define a closed fluid loop and the diaphragms 22 and 24 divide the closed loop into two non-communicating portions. Newtonian liquid 32 along with a float 34 having a density equal to the liquid 32 fills the compartment 28. A second Newtonian liquid 36 having a density different from the density of the liquid 32 fills the compartments 26 and 30 and the passage 12.

Those skilled in the art will appreciate that if the liquid 32 has a greater density than the liquid 36, an increase in velocity of the case 10 as it moves from left to right as viewed in FIGURE 1 causes the heavier fluid 32 to move to the left and the fluid 36 to move generally to the rgiht through the passage 12. Such displacement of the liquids 32 and 36 causes the diaphragms 22 and 24 to bow to the left. It is to be understood that the float 34 will displace to the left with the liquid 32 and not relative to it.

In the nulling subsystem 14, the housing 18 includes a chamber 40 within which is mounted a positive displacement pump in the form of a rotor 42. The cylindrical rotor 42 eccentrically mounted within the chamber 40 rotates on its shaft 44 which is driven by the motor 46. The rotor 42 engages the wall of the chamber 40 and slides about it in response to rotation of the motor. A pair of passages 47 and 48 communicate with the chamber 40 on each side of a rectractible blade 50 which is slidably mounted in a slot 52 formed in the housing 18. A spring 54 disposed in the bottom of the slot 52 biases the blade 50 to an upward position wherein it extends out of the slot and engages the cylindrical rotor 42. Thus, as the rotor turns in the chamber 40, the blade 50 moves in and out of the slot 52 and follows the surface of the rotor. It will be appreciated that as the rotor turns, the liquid which fills the passage 16, the passages 47 and 48, and the chamber 40 is forced to displace either in a clockwise or a counter clockwise direction in the nulling subsystem depending upon the direction of rotation of the rotor. For example, assume that the rotor 42 rotates counter clockwise in the chamber 40. The liquid disposed ahead of the rotor 42 in the chamber will be forced out through the passage 47 and into the left arm of the duct 16 in the nulling subsystem. On the other hand, when the rotor turns in a clockwise direction, the liquid in the chamber 40 lying ahead of the rotor will be forced out of the chamber through the passage 48. In each case, liquid is drawn into the chamber 40 behind the rotor 42 in response to its rotation.

Those skilled in the art will now readily appreciate that if the motor 46 is caused to rotate and thus drive the rotor 42 whenever the float 34 displaces in its chamber 28, the subsystem may be made to move the liquids and thus restore the float 34 to its reference or "no displacement" position. Such an arrangement is suggested diagrammatically in FIGURE 1.

A pair of electrodes 56 and 58 are secured to the wall of the compartment 28 adjacent the float 34. By employing a conductive liquid in the compartment 28, the electrodes may be used to measure the displacement of the float resistively. As the float 34 displaces relative to the electrodes 56 and 58, the resistance between the electrodes increases and a simple bridge circuit may be used to detect that change. Such a change in resistance is directly proportional to the displacement of the float from its reference or initial position. The signal generator 60 represented by the box in FIGURE 1 contains the bridge circuit. The generator also includes a power source and thus produces a signal proportional to the displacement of the float which in turn is proportional to the change in the velocity of the instrument. The signal produced by the signal generator 60 is directed through amplifier 62 to the motor 46. By connecting the motor 46 to the signal generator 60 so that the motor drives the shaft 44 in a counter clockwise direction in response to displacement of the float 34 to the left and so that the motor drives the shaft 44 in a clockwise direction in response to displacement of the float to the right, the subsystem will always generate forces to null the displacement of the float. A counter 64 which records the number of rotations of the shaft 44 may be employed to indicate visually the changes in the velocity of the instrument, because the rotation of the shaft is directly responsive to the displacement of the float. Those skilled in the art will also appreciate that an electrical signal generator may be employed for digital indication of the output of the instrument.

The embodiment of my invention shown in FIGS. 2-7 differs from the preferred embodiment of FIGURE 1 only in the details of the nulling subsystem. The instrument includes a case 10, a capillary passage 12 and a seismic element identical to that of the preferred embodiment. These elements are identified by the same reference characters.

In the subsystem of the embodiment shown in FIGS. 2-7, a housing 66 interrupts the duct 16 and the duct is bifurcated so as to communicate with the housing at four points. The branches formed by the divided passage are designated 68, 70, 72 and 74 and include valves 76, 78, 80 and 82, respectively. The electrical system used to control the positions of these valves will be described in detail below.

A piston 84 movable in the housing 66 provides the driving force to restore the fluids 32 and 36 to their initial or reference position. The piston 84 works through a fluid 36' which fills the passage 16 including its bifurcated ends and the chamber within housing 66. The fluid 36' preferably is identical to the fluid 36 and is free to mix with it. In such an arrangement it is unnecessary to employ a second pair of diaphragms to separate the liquid 36' from the rest of the system.

Figure 3:
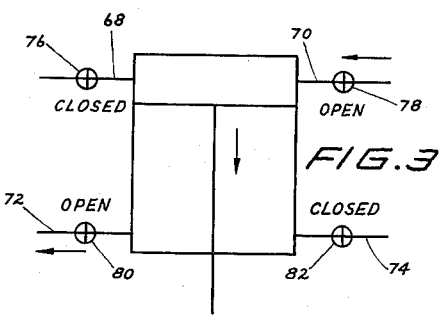
FIGURES 3 to 6 are diagrammatic line drawings illustrating different settings of the valves and piston in the nulling device forming part of the embodiment of FIGURE 2.

Assume that the liquid within the closed path defined by the chamber 20 and the passage 12 has displaced counter-clockwise as viewed in FIGURE 2. To restore the liquid in that closed path or loop to its non-displaced position, it is necessary to drive the liquid 36' within the nulling subsystem 14 in a generally clockwise direction. Assume also that the piston 84 is at the top of its stroke as shown in FIGURE 3. By opening the valves 78 and 80, closing the valves 76 and 82, and moving the piston 84 downwardly in the housing, the liquid within the housing will be driven out through the branch 72 and additional liquid will be drawn into the housing behind the piston through the branch 70. The displacement of the liquid 36' in this manner will force additional liquid into the compartment 26 and draw some of the liquid out of the compartment 30. The liquid driven into the compartment 26 will be divided between the chamber 20 and the capillary passage 12. If the design of the instrument is such that the resistance to flow in the capillary passage 12 far exceeds the resistance to flow in the chamber, virtually all of the liquid will tend to restore the diaphragms 22 and 24 to their initial position and displace the liquid 32 accordingly. The stiffness of the diaphragms 22 and 24, the viscosity and density of the liquids 32 and 36, and the relative cross sectional areas of the passage 12 and chamber 20 will determine the division of flow. Because the actual division is a determinable factor in the system it is possible to design the instrument so that the piston 84 exactly restores the diaphragms and the seismic liquids to their initial positions.

Figure 4:
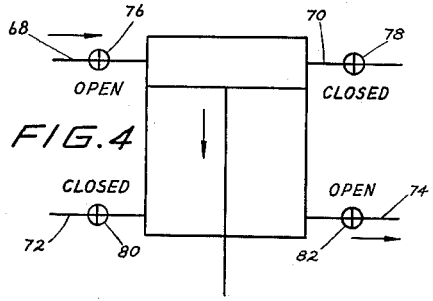
Figure 5:
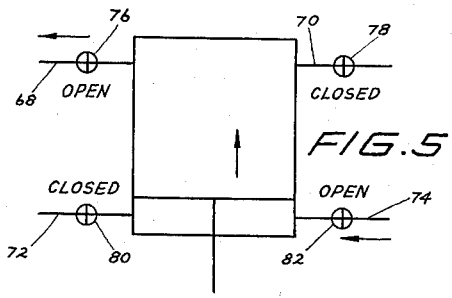
Figure 6:
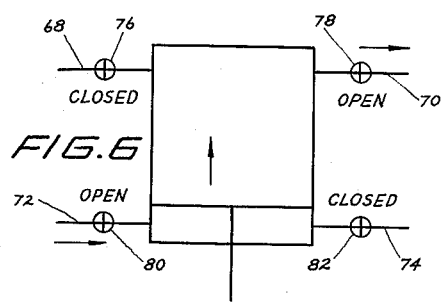

If the displacement of the liquid in the closed loop is in a generally clockwise direction and the piston is at the top of its stroke, by opening valves 76 and 82, closing valves 78 and 80, and moving the piston downwardly, counter-clockwise flow of the liquid 36' results, as suggested in FIGURE 4 and the system is nulled. In FIGURES 5 and 6 the piston 84 is shown in its lowermost position and the arrows indicate the direction of liquid flow through the branches 68, 70, 72 and 74 with different valve settings. In FIGURE 7, I have illustrated a system for controlling the operation of the valves and piston to null the instrument.

In FIGURE 7, the signal generator 60 which includes a power source and the bridge circuit of conventional design as described in connection with the preferred embodiment of FIGURE 1, senses the displacement of the float 34 in either direction from a reference position and produces a signal which is proportional to the change in the velocity of the instrument. This signal is amplified by the amplifier 62 and directed to a motor 85 which drives the piston 84 disposed within the housing 66 in the nulling subsystem. The motor 85 which also is of conventional design is bidirectional and therefore may turn the crank 86 which is connected to the motor shaft in either direction. The motor is so arranged that it will rotate in one direction in response to movement of the float 34 in one direction and will rotate in the other direction in response to movement of the float 34 in the other direction.

A connecting rod 88 interconnects the crank 86 and the piston 84, and thus, as the crank 86 rotates the piston 84 moves back and forth in the housing 66.

The reader will recall that the valves 76 and 82 and the valves 78 and 80 open and close in pairs depending upon the direction of the desired flow through the nulling subsystem. Thus, when flow is desired in a generally clockwise direction through the subsystem, either valves 76 and 82 or 78 and 80 are opened depending upon the direction of movement of the piston 84 in the housing 66. It will be noted in FIGURE 7 that the solenoids controlling the valves 76 and 82 are connected in series across the amplifier 62 and in a like manner the solenoids controlling the valves 78 and 80 are connected in series. These pairs of solenoids are alternately placed across the amplifier by the pair of double throw switches 94 and 96 which are in turn controlled by the relay coils 98 and 100, respectively. When the coils 98 and 100 are energized, they draw the blades of the switches 94 and 96 to the position illustrated, thereby placing the coils of valves 76 and 82 across the amplifier output. When the relays 98 and 100 are de-energized, the blades are moved to the other position under the bias of the springs 102 and place the solenoids of valves 78 and 80 across the amplifier output.

The relay coils 98 and 100 are connected in parallel across the amplifier output but are unaffected by the switches 94 and 96. Rather, the switch 104 which is opened and closed under the influence of the piston 84, as will be described more fully below, controls the energization of the relays.

A pair of actuators 106 and 108 are carried on the piston rod 84 and open and close the switch 104 when the piston reaches extreme positions in the housing 66. For example, when the piston 84 moves to a position in the housing 66 represented by the broken line representation at 84a, the actuator 106 snaps the blade of switch 104 to its mating contact. The switch 104 which may be any type of conventional snap acting switch will remain in a closed position until the piston reaches the position at the other end of the housing 66 as suggested by the broken line representation at 84b. When the piston reaches that position, the actuator 108 engages the blade of switch 104 and snaps it away from its contact.

The system operates as follows. Assume that the instrument accelerates to the right as viewed in FIGURE 2 and the liquid contained within chamber 32 has a greater density than the liquid contained within the chambers 26 and 30 and the passage 12. This change in velocity will cause the float 34 to displace in a direction opposite to the direction of movement of the instrument, that is, to the left in FIGURE 2. When this occurs, the signal generator 60 produces a signal which is a function of the float displacement. Also assume that the piston 84 is in the position shown in solid lines in FIGURE 7, and assume further that the switch 104 is closed as shown. It is also necessary to make one further assumption, that is, that a signal produced by displacement of the float to the left as viewed in FIGURE 2 will cause the motor 85 to turn the crank 86 in a counter clockwise direction as shown in FIGURE 7 and that displacement of the float to the right in FIGURE 2 will cause clockwise rotation of the crank. Thus, because the float has displaced to the left, the crank 86 will rotate counter clockwise and the piston 84 will move upwardly in the housing 66 as viewed in FIGURE 2 forcing the liquid within the nulling subsystem to move in a generally clockwise direction. Liquid will be drawn into the housing 66 behind the piston 84 through the open valve 82 and similarly liquid will be forced out of the housing in front of the piston through the open valve 76. When the piston reaches the position suggested by the broken line representation at 84b, the actuator 108 will open the switch 104 causing de-energization of the relays 98 and 100. The de-energization of the relays will release the switches 94 and 96 and the springs 102 will cause the switches to move and place the solenoids of valves 78 and 80 across the amplifier output. Thus, as the piston moves downwardly in the housing 66 in response to continued acceleration of the instrument in the same direction as viewed in FIGURE 2, the liquid in the nulling subsystem will continue to flow in a clockwise direction in view of the fact that the valves 78 and 80 are open.

When the instrument ceases to change in velocity, the signal generator will no longer produce a signal to drive the motor 85. In addition, all of the solenoid valves will close by virtue of the fact that no output signal will come from the amplifier.

Now consider the effects of a deceleration of the instrument. The deceleration will cause the float 34 to displace to the right as viewed in FIGURE 2 and the signal produced by the signal generator will cause the motor 85 to rotate in a clockwise direction. Thus, because the valves 78 and 80 are open, the liquid in the nulling subsystem will flow in a generally counter clockwise direction to counteract the displacement. This flow in the subsystem, as has been suggested above, will return the float 34 to a reference position and counteract any bellowing action of the diaphragms 22 and 24.

Having described the instrument and its operation in detail, it is only necessary to describe the manner in which the instantaneous changes in velocity may be measured. This may be accomplished in a number of ways. Perhaps the simplest way of obtaining the desired measurement is by recording the revolutions of the crank shaft 86. The number of degrees through which the crank turns is directly proportional to the changes in velocity. The counter 64 may be used for this purpose. Alternatively, a scale could be mounted adjacent the piston rod 84 to record or indicate the amount of travel of the piston. This too would yield a reading which is directly proportional to the change in velocity. The measurement could also be obtained by producing an electrical signal in coded digital form.

In the embodiment of my invention shown in FIGURES 8 and 9 the teachings described above are incorporated into an integrating angular accelerometer. The instrument which includes all of the features of my invention disclosed in application Ser. No. 710,660 comprises a case 101 rigidly connected to a shaft 103 adapted to connect the case to the mass whose change in velocity is to be measured. Although a shaft is shown, obviously any form of coupling device may be used.

Within the case 101 is a circular passage 105 having a portion 107 with a large cross section and a second portion 109 with a much smaller cross section. The closed continuous passage 105 is filled with a viscous Newtonian liquid 110. A diaphragm 112 extends across and is secured to the walls of the enlarged portion 107 of the passage and is impervious to the liquid and thus the liquid may not pass through it from one side of the enlarged portion of the passage to the other.

Perforated plates 114 are disposed parallel to and on each side of the diaphragm 112 within the portion 107 of the passage. These walls are rigid, i.e., unyielding to any pressure applied to them by the liquid 110, unlike the diaphragm 112 which readily distorts in response to displacement of the liquid. The plates 114 and the diaphragm 112 define a portion of the signal generator to produce an electrical signal proportional to the displacement of the liquid. The plates and diaphragm may act resistively or capacitatively to perform this function and comprise part of a standard bridge circuit. In my copending application Ser. No. 710,660 I demonstrate mathematically that the displacement of the liquid to which the signal generator responds is proportional to the change in velocity of the case about the axis of the shaft 103. This material is incorporated by reference here.

The nulling subsystem 120 includes an enlarged cylindrical chamber 122 connected by passage 124 to the ends of the enlarged portion 107 of the passage 105. An eccentrically mounted cylindrical rotor 126 within the chamber 122 acts upon the liquid 128 which fills the passage 124 and chamber 122 and causes it to displace in the same manner as described in connection with the embodiment of FIGURE 1. A bidirectional motor 130 having a shaft 132 drives the rotor 126. The circuitry of FIGURE 1 may be employed to drive the motor 130. The slip ring assembly 134 may be used to make the necessary connections to the motor and signal generator. Thus, by causing the motor 130 to drive the rotor 126 whenever the diaphragm 112 displaces relative to the fixed plates, the liquid 128 in passage 124 will restore the diaphragm to its neutral or reference position. A counter may be employed to record the revolutions of the shaft 132. Alternatively, as in each of the other embodiments an electrical signal output in coded digital form may be employed.

Although I have not shown the use of the nulling subsystem of FIGURES 2–7 in combination with the integrating angular accelerometer, those skilled in the art will appreciate that this combination may be employed and comes within the scope of my invention.

Having described in detail three embodiments of my invention, those skilled in the art will appreciate that numerous modifications may be made of it without departing from its spirit. Therefore, I do not intend to limit the breadth of the invention to the two embodiments illustrated and described. Rather, it is my intention that the scope of my invention be determined by the appended claims and their equivalents.

What I claim as new and desire to secure by Letters Patent of the United States is:

1. A device of the character described comprising a closed and continuous passage, a pair of diaphragms disposed across the passage at different locations and dividing the passage into two non-communicating compartments, a portion of the passage having a larger cross section than the remaining portion of the passage, liquids of different densities filling each of the compartments, means for producing a signal which is a function of the displacement of the liquids in response to a change in velocity of the passage, and means including a pump operatively associated with the liquids and responsive to the signal for restoring the liquids to their initial positions.

2. Apparatus comprising a pair of closed and continuous passages, said passages having a common compartment, a pair of diaphragms separating that compartment from the remaining portions of the passages, said compartment having a cross sectional area substantially greater than other portions of the passages, a Newtonian fluid filling the compartment, a second Newtonian fluid of different density filling the remaining portions of the passages, and pressure generating means disposed in the remaining portion of one of the passages and responsive to displacement of the fluid in the compartment for restoring the diaphragms to a reference position.

3. An integrating accelerometer comprising a case, a chamber formed in the case, a pair of spaced apart diaphragms extending across the case and dividing the chamber into a central and two end compartments, a capillary passage interconnecting the end compartments and of smaller cross section than the chamber, a second passage interconnecting the end compartments, a Newtonian liquid filling the passages and the end compartments, a second Newtonian liquid of different density filling the central compartment, and means disposed in the second passage and responsive to the displacement of the liquid in the central compartment for generating a restoring pressure in the liquid in the second passage to return the liquid in the central compartment to a reference position.

4. A device as defined in claim 3 further characterized by said means comprising a positive displacement pump, a motor for driving said pump, and a signal generator responsive to the displacement of the liquid in the central compartment for driving said motor.

5. A device as defined in claim 4 further characterized by said positive displacement pump comprising a housing, a cylindrical chamber formed in said housing, an eccentrically mounted rotor disposed in said chamber, said rotor engaging the inner wall of the chamber, a vane movable in and out of the wall of the chamber and engaging said rotor, and inlet and outlet ducts connected to the second passage and communicating with the chamber on each side of the vane.

6. A device as defined in claim 4 further characterized by said positive displacement pump comprising a housing, a chamber formed in the housing, a piston movable in the chamber, and a pair of ducts connected to each end of the chamber beyond the ends of the piston stroke with one passage at each end of the chamber communicating with each of the end compartments through the second passage.

7. A device of the character described comprising a closed and continuous passage, a pair of diaphragms disposed across the passage at different locations and dividing the passage into two non-communicating compartments, one of said compartments having a larger cross section than a portion of the other compartment, a Newtonian liquid filling one of the compartments, a second Newtonian liquid of different density filling the other compartment, means at least in part mounted in said one compartment for producing a signal proportional to the displacement of the liquid in that compartment, and means responsive to that signal and operatively connected to the other of the compartments for restoring the liquid in said one compartment to a reference position.

8. A device as defined in claim 7 further characterized by said means comprising a second passage having its ends connected to said other of the compartments on opposite sides of said one compartment, a liquid filling the second passage, and a pump energized by the signal producing means and disposed in the second passage for moving the liquid in that passage in a direction opposed to the displacement of the liquid in the larger compartment.

9. Apparatus comprising a closed and endless passage, yieldable separators disposed across the passage at different locations and dividing the passage into two non-communicating compartments, one of the compartments having a portion of smaller cross section than the other compartment, Newtonian liquids of different density filling each of the compartments, a signal generator operatively associated with the liquid in said other compartment for producing a signal proportional to the displacement of the liquid in that compartment, and means responsive to the signal of the signal generator for moving the liquids in the compartments in a direction opposed to their displacement.

10. A device as defined in claim 9 further characterized by said means comprising a second passage having its ends connected to the said one compartment on opposite sides of said other compartment, a positive displacement pump in the second passage, a liquid filling the second passage and the pump, and a motor responsive to the signal for driving the pump.

11. A device as defined in claim 10 further characterized by the positive displacement pump comprising a housing, a cylindrical chamber formed in the housing, an eccentrically mounted rotor disposed in and engaging the wall of the chamber, a vane movable in and out of the wall of the chamber and engaging the rotor, said motor being bi-directional and driving said rotor, and ducts communicating with said chamber on opposite sides of the vane and connected to the second passage.

12. A device of the character described comprising a case, an endless passage formed in the case, means for securing the case to a rotating body to impart the rotation of the body to the case, said passage having a finite projected area in a plane perpendicular to the axis about which the case is adapated to rotate, a chamber of enlarged cross section formed as part of the passage, Newtonian liquid filling the passage, a signal generator adapted to produce a signal in response to displacement of the liquid in the chamber, and means responsive to the signal for producing a counter pressure on the liquid to restore the liquid to a non-displaced position in the passage.

13. A device as defined in claim 12 further characterized by the last-named means including a second passage having its ends connected to the opposite sides of the chamber, said opposite sides being displaced angularly relative to the axis of rotation of the case, liquid filling the second passage, a pump disposed in the second passage, and a motor electrically actuated by the signal generator and driving the pump.

14. A device as defined in claim 13 wherein said pump is a positive displacement pump and drives the liquid in the second passage in a direction opposite to the direction of displacement of the Newtonian liquid in the chamber.

15. A device of the character described comprising a case, an endless passage formed in the case, a portion of said passage having an enlarged cross-section, Newtonian liquid filling the passage, means disposed in the passage adapted to produce a signal proportional to the displacement of the liquid in the passage, a second passage having its ends secured to the endless passage on opposite sides of the signal producing means, liquid filling the second passage, and a pump in the second passage operable in response to the signal for exerting a counter pressure on the Newtonian liquid for restoring the Newtonian liquid to a non-displaced position.

16. Apparatus comprising a closed and endless passage, yieldable separators disposed across the passage at different locations and dividing the passage into two non-communicating compartments, Newtonian liquids of different density filling each of the compartments, a signal generator operatively associated with the liquid in one of the compartments for producing a signal proportional to the displacement of the liquid in the passage, said passage having a portion of substantial length with a smaller cross-section than the remaining portion of the passage, and means responsive to the signal of the signal generator for moving the liquid in the passage in a direction opposed to its displacement.

References Cited in the file of this patent

UNITED STATES PATENTS

| | | |
|---|---|---|
| 2,225,716 | Sexton | Dec. 24, 1940 |
| 2,591,921 | Cosgriff et al. | Apr. 8, 1952 |
| 2,778,905 | Statham | Jan. 2, 1957 |
| 2,898,538 | Rafferty | Aug. 4, 1959 |

FOREIGN PATENTS

| | | |
|---|---|---|
| 533,423 | France | Dec. 9, 1921 |
| 20,676 1913 | Great Britain | Sept. 14, 1914 |
| 25,186 1901 | Great Britain | Dec. 4, 1902 |